April 3, 1962 E. D. NELSON 3,027,560
DIMPLER MECHANISM FOR FASTENER DRIVING MACHINES
Filed July 15, 1960 2 Sheets-Sheet 1
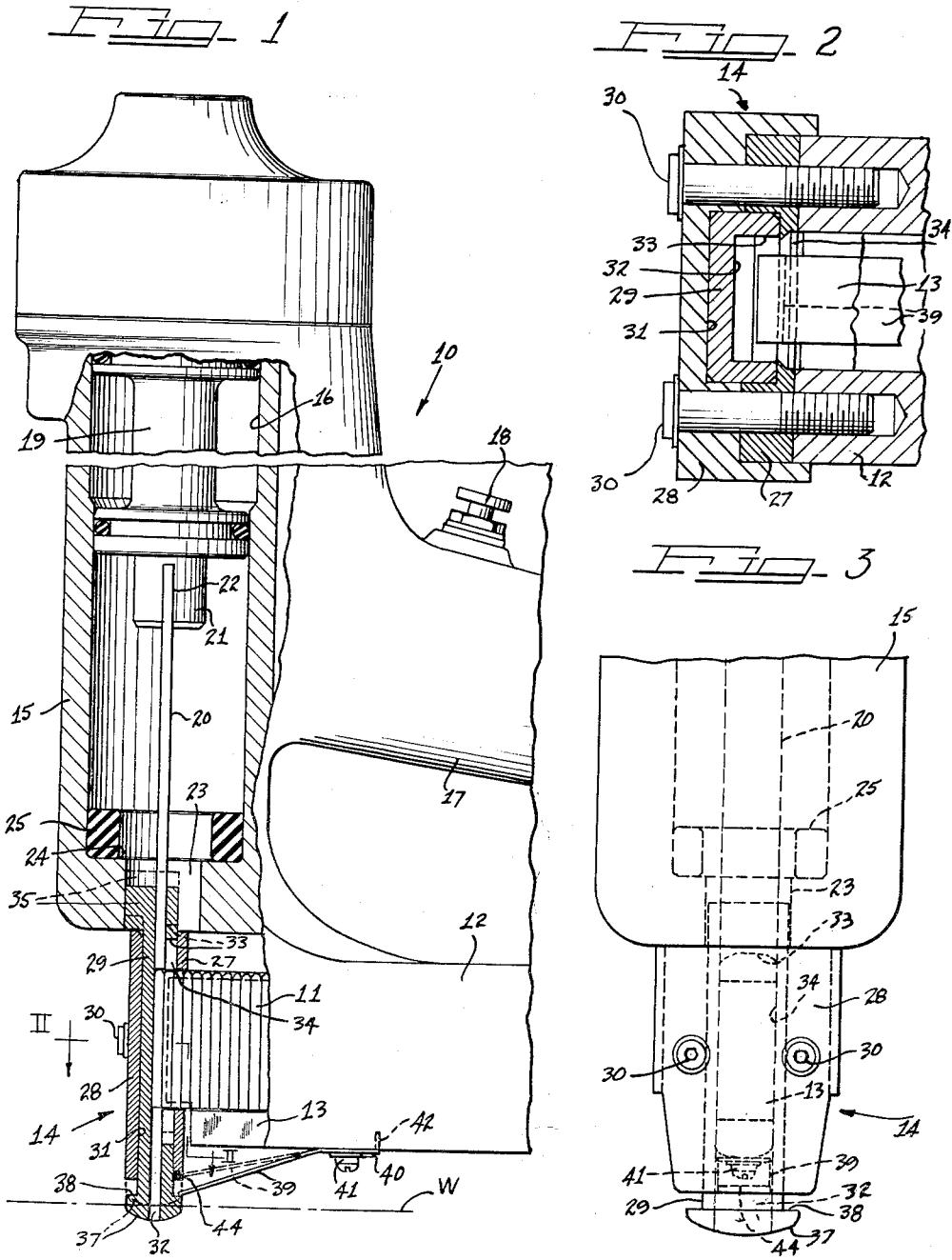
Inventor
Edward D. Nelson

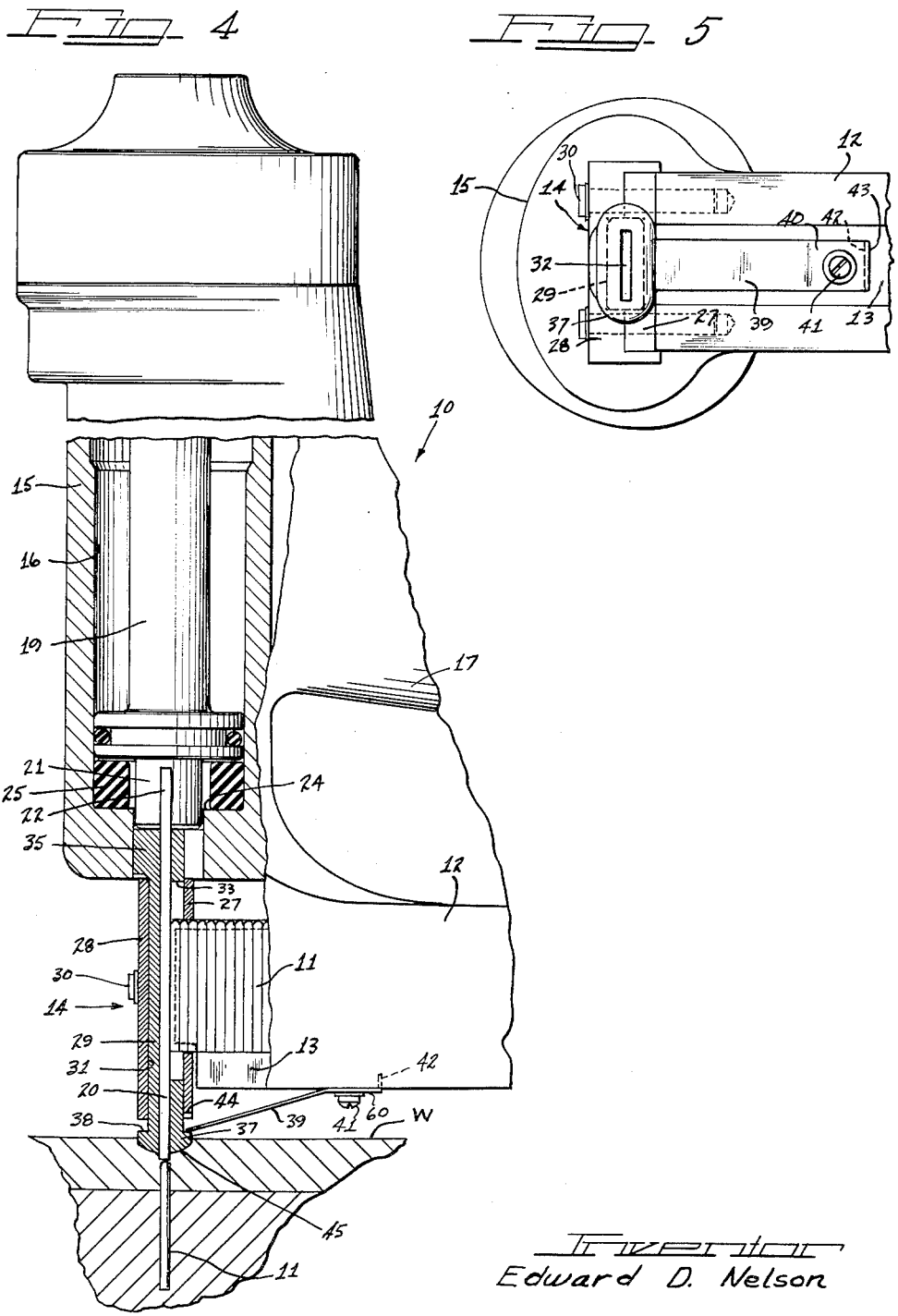

United States Patent Office 3,027,560
Patented Apr. 3, 1962

3,027,560
DIMPLER MECHANISM FOR FASTENER DRIVING MACHINES
Edward Donald Nelson, Evanston, Ill., assignor to Spotnails, Inc., Evanston, Ill., a corporation of Illinois
Filed July 15, 1960, Ser. No. 43,023
9 Claims. (Cl. 1—49)

The present invention relates to improvements in fastener driving machines and more particularly in such machines which are equipped with pneumatically actuated fastener drivers.

In securing wallboard to wooden supporting structure such as studs and rafters, it is highly desirable that the heads of the fasteners be countersunk and that in addition a limited area of the surface of the wallboard about the countersunk fastener head or crown be formed with a uniform slight depression to receive a hardenable filler flush with the normal surface of the wallboard so that the surface of the wallboard can be attractively painted or otherwise finished with the points at which the wallboard is fastened effectively concealed. It has therefore been proposed to provide a dimpling head to be actuated by the fastener driving mechanism to provide the desired shallow depression or dimple in the wallboard surface incident to driving the fastener in each instance.

Due to the high impact with which at least pneumatic fastener driving machines of the type disclosed in John E. Goldring et al. Patent 2,872,901 operate a problem has been encountered in that if the driving mechanism is free fired, that is, is triggered to fire without engagement of the dimpler against the work, there is liability of breakage of the dimpler as a result of the great impact of the driving piston against the dimpler without the shock absorbing benefit of a work surface.

It is, accordingly, an important object of the present invention to provide an improved dimpler mechanism for pneumatic fastener driving machines in which possible damage to the dimpler during free firing of the machine is substantially precluded.

Another object of the invention is to provide a dimpler mechanism which is equipped to remain out of driving impact range of the driving member of the pneumatic fastener driving machine with which associated except when the dimpler is in engagement with a work surface in fastener driving orientation.

A further object of the invention is to provide in a pneumatic fastener driving machine a dimpler mechanism equipped with biasing means normally maintaining the dimpler out of effective dimpling impact range of the driving member of the machine but yieldable when the dimpler is applied to a work surface to permit effective positioning of the impact receiving portion of the dimpler in the thrust path of the driving member of the machine.

Still another object of the invention is to provide novel safety means for dimpling devices associated with pneumatic fastener driving machines.

Other objects, features and advantages of the present invention will be readily apparent from the following detailed description of a preferred embodiment taken in conjunction with the accompanying drawings, in which:

FIGURE 1 is a fragmental, partially sectional elevational view of the forward or head end of a pneumatic fastener driving machine embodying features of the invention;

FIGURE 2 is an enlarged fragmentary sectional detail view taken substantially on the line II—II of FIGURE 1;

FIGURE 3 is a fragmentary front elevational view of the lower driving or nose portion of the machine;

FIGURE 4 is a fragmental sectional elevational view similar to FIGURE 1 but showing the relationship of elements at the end of a driving stroke of the fastener driver and the associated dimpler; and FIGURE 5 is a fragmentary bottom plan view of the head end portion of the machine showing the dimpler and the safety biasing spring structure.

For purpose of illustration, a manual pneumatically actuated fastener driving machine 10 has been depicted of generally the type more fully disclosed in John E. Goldring et al. Patent 2,872,901 issued February 10, 1959. Such a machine is adapted to drive suitable fasteners such as nails or staples 11 as shown housed within a base magazine 12 of the machine. Any suitable construction within the magazine 12 may be employed for supporting adhered "sticks" of the staples 11, herein comprising a staple track bar 13 by which the staples are guided into position within a staple guideway nose assembly 14 under a driver head portion 15 of the machine.

Projecting rearwardly from the head portion 15 over the magazine portion 12 is a handle structure 17 which may also provide part of an air reservoir from which compressed air is controlled by means such as a valve structure including a manually depressible button 18 on the upper side of the handle 17 adjacent to juncture with the head portion 15. By means of the control valve actuator 18, operation of a piston 19 within a cylinder 16 in the head portion 15 is controlled to drive a fastener driving blade 20 in driving and return strokes.

On its lower end, the piston 19 has a depending boss 21 provided with a vertical slot 22 within which the upper end portion of the driver blade 20 is secured. This boss is adapted to project down into a downwardly opening port 23 of smaller diameter than and leading from the lower end of the cylinder 16. About the opening 23 is a ledge 24 upon which is seated a resilient bumper 25 of suitable material having the characteristics of rubber and against which the lower end of the piston 19 about the boss 21 comes to rest at the end of a driving stroke.

Normally, the lower end portion of the driver blade 20 projects downwardly through the opening 23 and into the nose assembly 14 comprising an assembly of three main components, namely, a facing plate 27, a front plate 28 and a combination fastener guide and dimpler member 29 (FIGURES 1, 2 and 3). A pair of attachment screws 30 secures the front plate 28 against the facing plate 27 and the facing plate against the forward end of the casing or housing portion providing the magazine 12. Between them, the facing plate 27 and the front plate 28 provide a vertical guideway complementary to and slidably engaging the dimpler 29 which is of generally rectangular cross-section provided through out its length with a vertical driver guideway and staple driveway 32, with a rearwardly opening entry doorway 33 of the dimpler member opening toward a staple passage doorway 34 in the facing plate 27, through which the forward portion of the staple track 13 projects as best seen in FIGS. 1 and 2.

At their upper ends the facing and front plates 27 and 28 are in a common plane at the lower end of the downward opening 23 from the head 15 of the machine. At its upper end the dimpler 29 has a head portion 35 normally projecting above the upper ends of the facing and front plates of the nose assembly and into the opening 23. On its forward side, the dimpler head 35 projects into overlying relation to the upper end of the front plate 28. This provides a stop limiting downward projection of the dimpler member 29.

One its lower end, the dimpler member 29 has a dimpling foot 37 which is of curvate face shape both from front to rear and from side to side as visualized in FIGURES 1 and 3. This dimpling foot 37 includes a flange 38 underlying the coplanar lower ends of the facing and front plates 27 and 28 of the nose assembly and serving as a retainer stop limiting retraction upwardly of the dimpler 29. The distance between the forwardly projecting overhanging stop portion of the dimpler head 35 and the upwardly facing foot flange 28 is greater to a predetermined extent than the length of the facing and front plates so as to afford a limited range of vertical movement of the dimpler 29, as indicated in FIG. 1, between the full line and dash line positions. In either of such positions, the lower driving end portion of the driving blade 20 is reciprocably guidedly engaged within the driver guide and staple driveway 32 of the dimpler, with the driving tip of the driver normally located slightly above the position occupied by the crown of the next to be driven staple 11 in the guideway 32.

According to the present invention, the dimpler 29 is normally biased to project to its maximum downward extent relative to the facing plate and front plate of the nose assembly 14, namely, the full line position shown in FIGURES 1 and 3. Such bias is imparted by yieldable biasing means, suitably in the form of a fixed flat lever spring 39 mounted in substantially protected relation under the magazine section 12 and behind the downwardly projecting portion of the nose assembly 14. Conveniently, the spring member 39 is of light gauge and narrow strip form comprising throughout the major extent of its length a downwardly and forwardly projecting resilient spring arm extending diagonally from a rear end portion attachment base 40 secured as by means of a screw 41 to the underface of the staple rail or track 13. An upstanding terminal flange 42 on the free end of the base 40 (FIGS. 1 and 4) extends into a suitable transverse slot 43 in the supporting member and thereby anchors the spring member against turning about the axis of the screw 41 and thereby maintains the spring member in the desired forward orientation. At its forward tip the spring arm 39 engages against the rear portion of the upwardly facing shoulder flange 38 of the dimpler foot 37. Thus, by downward thrusting of the forward tip portion of the spring member 39 against the dimpler foot shoulder 38, the dimpler 29 is normally biased into the downward projected position. This avoids a non-operating retracted disposition of the dimpler wherein the dimpler head 35 would be positioned to be struck by the driving piston blade supporting and striker boss 21 should the machine be free fired for any reason, such, for example as to determine working readiness. In the fully protracted, spring biased position of the dimpler 29, the crown of the dimpler head 35 is beyond impact range of the striking end of the piston boss 21 when the piston comes to a stop against the bumper 25.

In operation, the machine 10 is manipulated into position with respect to the surface of a wallboard W into which a fastening staple 11 is to be driven and the dimpler foot 37 pressed lightly against the surface of the wallboard, thereby overcoming the relatively light bias of the spring 39 and causing the dimpler to be retracted from the full line position as shown in FIGURE 1 into the dash line position, the extent of retraction being limited by the stop afforded by the dimpler foot flange 38 against the lower ends of the facing and front plates 27 and 28. In the fully retracted position, the trust tip of the spring 39 is accommodated in a downwardly opening clearance recess 44 provided in the lower end of the facing plate 27. The machine, often referred to as an air gun, is then fired. This results in the driving piston 19 actuating the driving blade 20 to drive the staple 11 thereunder through and from the driveway 32 in the dimpler into the wallboard W and a wooden supporting member to which the wallboard is to be attached, substantially as shown in FIG. 4, with the driving tip of the driver blade travelling slightly beyond the bottom of the dimpling foot 37 to countersink the crown of the staple.

In the final increment of the driving stroke, the piston boss 21 impacts against the crown of the retracted dimpler head 35, thus forcibly driving the dimpler 29 the limited distance permitted in a dimpling stroke which results in the rounded dimpling face of the dimpling foot 37 being thrust in compacting, dimpling relation into the surface of the wallboard W about the countersunk crown of the driven staple 11, substantially as shown in FIGURE 4 to provide a dimpled depression affording a fill-receiving recess 45. Of course, the depth of the recess 45 can be controlled within narrow limits by the pressure exerted initially against the surface of the wallboard W in the retracted condition of the dimpler 29. Where the pressure exerted is firm, the dimpler foot 37 will penetrate to the maximum depth enabled by the range of thrust permitted for the dimpler, while minimum pressure will enable spring-back or slight recoil of the machine after the dimpler foot has made only a limited dimple depression. In any event, at the terminus of driving stroke, the lower end of the piston 19 comes to a stop against the bumper 25 which limits the range of driving of the dimpler 29 to that permitted by the stop overhang of the dimpler head 35 opposing the upper end of the front plate 28 of the nose assembly.

Inasmuch as the biasing spring 39 is subject to only a very small range of flexing action in operation, and is not subject to any direct impact forces which might cause crystallization, virtual assurance against breakage of the spring 39 due to operating causes is had with the disclosed construction.

It will be understood that modifications and variations may be effected without departing from the scope of the novel concepts of the present invention.

I claim as my invention:

1. In a fastener driving machine including a reciprocable fastener driver and means for actuating the driver in a driving stroke, a dimpler associated with the driver and relative to which the driver is reciprocable, means reciprocably supporting the driver and the dimpler, means confining the dimpler to a limited range of reciprocable movement, the driver having an impact element movable therewith, the dimpler being movable into a retracted position upon engagement with a work surface and having a head portion engageable in the retracted position by the impact element during a driving stroke of the driver to project the dimpler forcibly into dimpling relation to the work surface, and biasing means normally maintaining the dimpler in projected position but yieldable to enable retraction of the dimpler upon pressing the dimpler against a work surface.

2. In a fastener driving machine including a reciprocable dimpler member having a driver guide and fastener passageway longitudinally therethrough and a fastener driver reciprocably engaged in said guideway, an impact element reciprocable with the driver and engageable in driving relation against the dimpler during a limited terminal portion of a driving stroke of the driver, the dimpler being shiftable toward the impact element by engagement of a dimpling foot on the dimpler against a work surface, and a biasing spring normally thrusting the dimpler into a protracted position.

3. In a fastener driving machine including a fastener driver and a generally tubular dimpler guidedly engaged about the driver and having an impact head at one end engageable by a thrust element reciprocable with the driver, the dimpler having a dimpling foot from which the driver is adapted to drive a fastener into a wallboard to be fastened, a biasing spring engaging said dimpling foot and normally thrusting the dimpler into a protracted position but being yieldable to enable retraction of the dimpler to move the impact head into position for driving thereagainst of the thrust element upon pressing the dimpling foot against a wallboard surface.

4. In a fastener driving machine including a supporting structure carrying a reciprocable tubular dimpler and a fastener driving member telescoped within the dimpler for driving fasteners inserted into the dimpler from a dimpling foot on the dimpler, the dimpler being restricted to a limited range of reciprocable movement between retracted and projected positions, and a resilient spring arm carried by the supporting structure and resiliently thrusting against the dimpling foot normally to maintain the dimpler yieldably in protracted position.

5. In a fastener driving machine including a supporting structure having a limited range reciprocable dimpler and a relatively reciprocable driver and impact assembly operable to drive fasteners from and beyond the dimpler and thrust the dimpler into dimple recess forming relation against a work surface into which a fastener has been driven by the driver, an elongated spring arm attached at one end portion thereof to the supporting structure and thrusting at a free end portion against a shoulder on the dimpler normally to urge the dimpler yieldably into protracted position.

6. In a fastener driving machine of the character described, a supporting structure including a pneumatic cylinder, a piston reciprocable in the cylinder, a fastener driver carried by the lower end of the piston and projecting below the lower end of the cylinder, a nose assembly carried by the supporting structure below the cylinder and including a vertically reciprocable dimpler having on its upper end an impact head, the lower end of the piston having a thrust element for impacting said head, the dimpler having a lower end dimpling foot including an upwardly facing shoulder, means limiting reciprocations of the dimpler between predetermined retracted and projected positions, a fastener supporting track structure carried by said supporting structure for guiding fasteners into position under said driver, and a spring arm carried by said track structure and thrusting against said shoulder for yieldably biasing the dimpler into normally projected position.

7. In a fastener driving machine of the character described including a fastener guiding and supply structure having on the forward end thereof a nose assembly including a reciprocable dimpler having a lower dimpler foot and an upper impact head, said nose assembly including a facing plate and a front plate providing a reciprocable guide for the dimpler, said plates providing upper and lower stop ends, the dimpler head having an overhang stop shoulder engageable with the upper stop end and the dimpler foot having an upwardly facing flange shoulder opposing the lower stop end, a driver reciprocably guided by said dimpler, means supported above said nose assembly for actuating the driver and including a thrust element engageable with the impact head of the dimpler when the dimpler is retracted to thrust the dimpler into projected position for dimpling a work surface, and a spring arm carried by said fastener supply means rearwardly from the nose assembly and extending forwardly and having a thrust end engaging said dimpler foot shoulder flange in normally biasing the dimpler into projected position out of impact range of said thrust element.

8. In a fastener driving machine of the character described including a nose portion having a reciprocable dimpler and a guide structure therefor, spring biasing means normally maintaining the dimpler in a projected position and comprising a flat spring arm having an attachment base, a supporting structure carrying said nose assembly, a screw securing said attachment base to the supporting structure, and a turn-preventing terminal projecting angularly from said attachment base, said supporting structure having a slot into which said terminal is engaged.

9. In a fastener driving machine of the character described including a fastener driver and a nose assembly reciprocably guiding the fastener driver and including guide structure and a reciprocable dimpler slidably guided by the guide structure, the guide structure including a downwardly facing stop shoulder, the dimpler having an upwardly facing stop shoulder opposing said downwardly facing shoulder, a spring arm of limited width engaging the upwardly facing shoulder and normally biasing the dimpler into a protracted position, said downwardly facing shoulder having a clearance recess receptive of said spring arm when the dimpler is moved in opposition to the spring bias to engage the upwardly facing shoulder against said downwardly facing shoulder.

References Cited in the file of this patent
UNITED STATES PATENTS
2,918,675    Smith _____ Dec. 29, 1959